Sept. 17, 1957  J. J. ARPS  2,806,372
BOREHOLE LOGGING APPARATUS
Filed Feb. 1, 1952  5 Sheets-Sheet 3

INVENTOR,
JAN J. ARPS
BY
Lyle Dillon
ATTORNEY

Sept. 17, 1957  J. J. ARPS  2,806,372
BOREHOLE LOGGING APPARATUS
Filed Feb. 1, 1952  5 Sheets-Sheet 4

INVENTOR,
JAN J. ARPS
BY
*Lyle Dillon*
ATTORNEY

Sept. 17, 1957  J. J. ARPS  2,806,372
BOREHOLE LOGGING APPARATUS
Filed Feb. 1, 1952  5 Sheets-Sheet 5
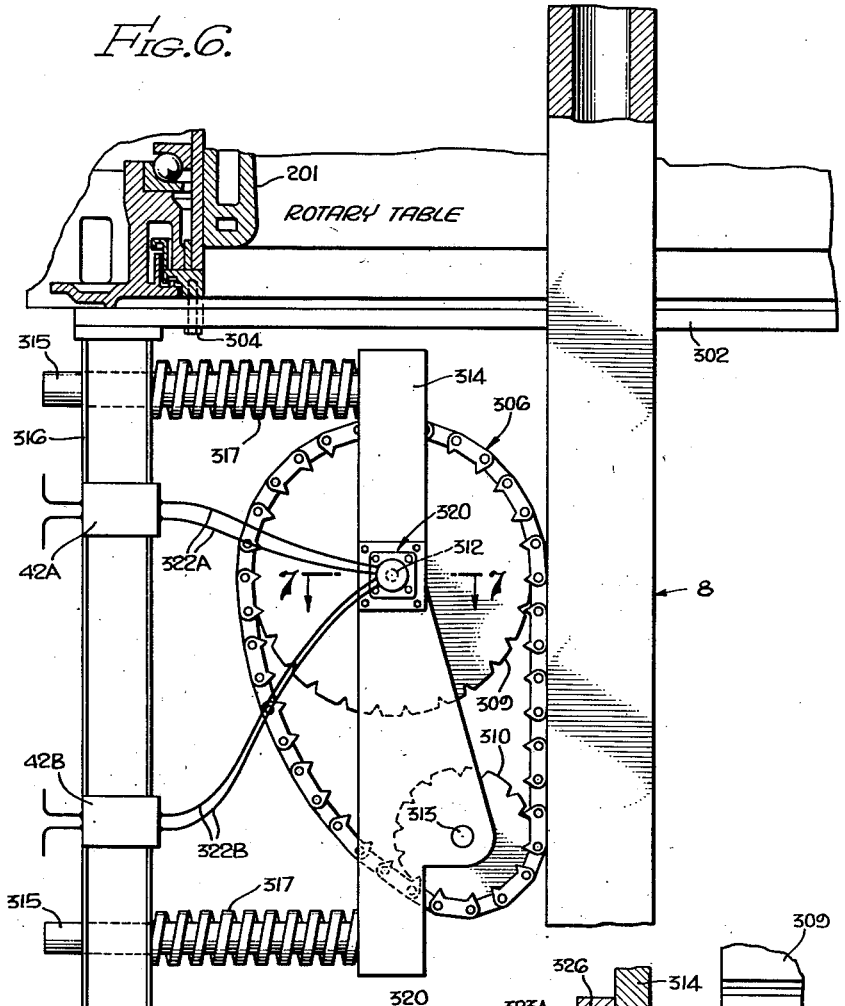
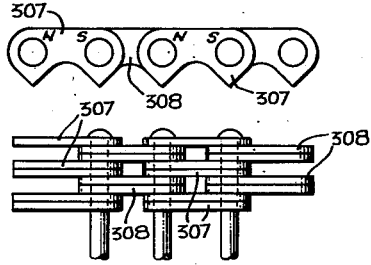
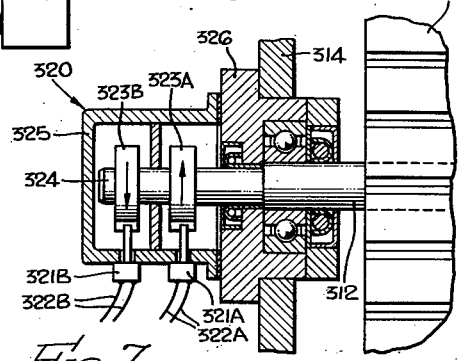
INVENTOR,
JAN J. ARPS
BY
Lyle Dillon
ATTORNEY

United States Patent Office 2,806,372
Patented Sept. 17, 1957

2,806,372

BOREHOLE LOGGING APPARATUS

Jan J. Arps, Tulsa, Okla.

Application February 1, 1952, Serial No. 269,568

14 Claims. (Cl. 73—151.5)

The present invention relates to well or borehole logging and more particularly to means for indicating and recording characteristics of geological formations surrounding the borehole. This application is a continuation-in-part of copending application Serial No. 90,503, filed April 29, 1949, now abandoned.

It is possible to produce logs of wells or boreholes simultaneously with the drilling as the drilling proceeds, by a system which comprises causing the introduction into the circulating drilling fluid, at a point within the borehole usually adjacent the drill bit, of a tracer material at a rate proportional to a characteristic of the surrounding geological formation to be logged, and detecting and measuring the thus introduced tracer present in the circulating drilling fluid arriving at or near the surface of the earth in correlation with the depth of the borehole. Methods of and apparatus for performing this borehole logging utilizing tracers introduced into the circulating drilling fluid as the measurement means are broadly disclosed in copending applications Serial Nos. 783,280, filed October 31, 1947, now Patent No. 2,658,725, and 55,301 now Patent No. 2,659,046, filed October 19, 1948. In view of the fact that in simultaneous drilling and logging operations, the depth of the borehole is continuously increasing, these methods of logging necessitate taking into account the time required for the tracer material to travel with the circulating drilling fluid from the point of introduction, which is generally close to the bottom of the borehole and in the vicinity of the drill bit, to the point of detection and measurement at or near the surface of the earth at the top of the borehole in order to correlate accurately the logging measurements and borehole depth.

It is accordingly an object of the present invention to provide new and improved apparatus for simultaneous drilling and logging of wells or boreholes, as before mentioned, which includes means for making a continuous record of tracer material measured in the arriving drilling fluid at a detection point at the top of the borehole, upon a movable record medium which is automatically moved in response to and in correlation with the corresponding location which the tracer releasing means had in the borehole at the time of the measured tracer release. In other words, it is an object of this invention to provide a system for driving the record medium, which automatically compensates for the increase in borehole depth taking place during the time required for the travel of the tracer from the point of introduction to the point of detection or measurement.

A further object of the present invention is to provide new and improved apparatus for simultaneously drilling and logging boreholes in which a continuous adjustment is made for the increase in travel time of the tracer from the bottom of the borehole to the detecting device at the top, as the depth of the borehole increases.

In accordance with the present invention, a variable which is representative of a value of the characteristic of the formation to be logged is recorded upon a suitable moving recording medium, which, for example, may be an elongated tape or strip chart. This tape or chart is drive by driving means which automatically compensates for the time required for the tracer to travel up the borehole from the point at which it is introduced into the circulating drilling fluid to the point at the top at which it is detected and measured. This compensation requires that the advance of the tape or chart be retarded a distance, relative to the recording stylus or pen, corresponding to the increase in depth of the borehole made during the said travel time.

Assuming for convenience of illustration that the drilling well has an actual depth $d_1$ at the instant a particular measurement is made of the tracer arriving at the top of the borehole, it is apparent that this depth value $d_1$ does not correspond to the actual depth at which the tracer being measured at this same instant was released. The mud sample and tracer which is measured at a given instant have been circulated up the borehole from a depth which was actually reached by the bit at an earlier time.

The number of strokes of a given drilling fluid circulating pump required for the tracer to be circulated from the point of tracer release at the bottom of the borehole to the detecting device at the surface is known for a particular borehole depth and size, and this may be assumed, for convenience of illustration and explanation herein, to be 1,000 pump strokes for the assumed borehole depth of $d_1$. Thus, under these conditions, the tracer being recorded at a particular instant, at the top of the borehole, may be assumed to have been released and to have left the release point at the bottom of the borehole at a time interval prior thereto corresponding to that required for the previous 1,000 pump strokes, and which corresponds to a borehole depth $D=d_1-d_2$, where $d_1$ is the before-mentioned depth occupied by the bit at the said instant of measurement, and $d_2$ is the increase in depth of the borehole drilled during the time interval corresponding to the before-mentioned 1,000 pump strokes. The present invention provides the necessary compensation corresponding to the distance $d_2$ so that the recording medium is driven in response to and in proper relation to the actual depth of the borehole at the time the tracer is released so as properly to correlate the tracer reading with depth.

Other objects, advantages, and features of novelty of the present invention will become apparent from the ensuing description of illustrative embodiments thereof in the course of which reference is had to the accompanying drawings, in which:

Figures 1 and 1A are schematic representations of apparatus constructed in accordance with the present invention;

Figure 6 is a fragmentary elevational view, partly in section, of another modification of the depth measuring apparatus which may be used in conjunction with the apparatus of Figure 1;

Figure 7 is a fragmentary cross-sectional view taken along line 7—7 of Figure 6;

Figure 8 is a fragmentary side elevational view of a portion of the magnetic chain illustrated in Figure 7;

Figure 9 is a plan view of the apparatus shown in Figure 8; and

Figure 1:
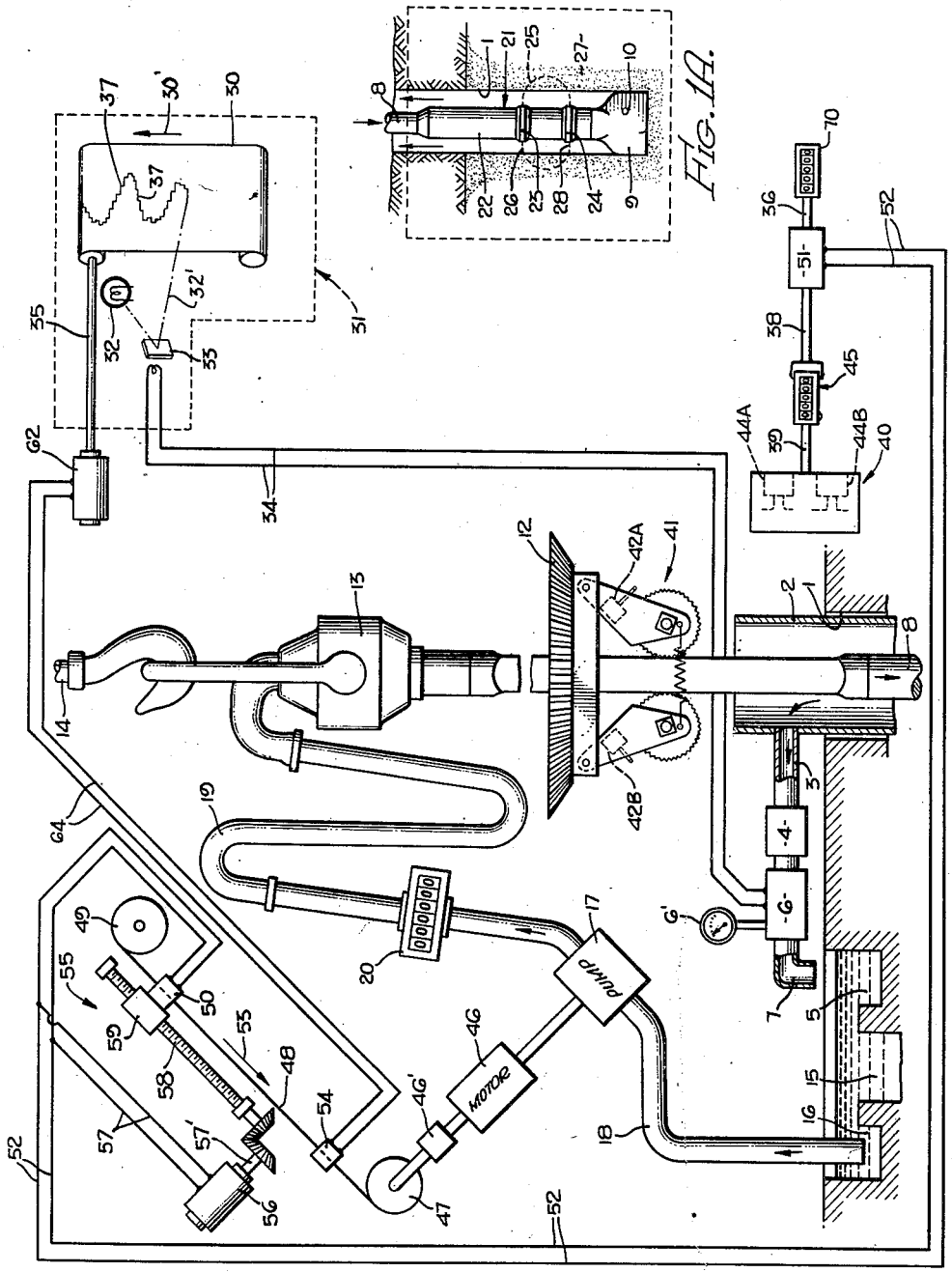

Referring now to the drawings and first to Figures 1 and 1A, it may be seen that these figures are schematic views including a vertical section through a well being drilled in accordance with the method and apparatus of the invention, in which means is provided for compensating for the normal time lag between the time a sample or increment of tracer-carrying drilling fluid or mud leaves the point at which the tracer was released into it and arrives at a detecting device at or near the surface of the earth.

The present invention is useful in the transmission of various signals from a borehole to the surface of the earth by use of a circulating fluid and is especially advantageous in borehole logging. As applied to logging, the method of the invention comprises measuring a given characteristic of geological strata at determined depths within a borehole and simultaneously releasing into the drilling fluid at a point of measurement a tracer, such as a radioactive tracer, accurately representative of the value of the characteristic under observation. The release may be either amplitude or frequency modulated, and, assuming it is the quantity or amount released that varies with the characteristic, the process is continued as the drilling progresses. As the value of the characteristic of the formation changes, the amount of tracer introduced into the drilling fluid is accordingly changed. Circulation of the mud stream in the borehole is utilized to carry the varying quantities of the thus introduced tracer to the top of the hole. Thus, by measuring the radioactivity of the mud leaving the top of the well and comparing it with the radioactivity of the mud entering the well, if there be such radioactivity, the increase in radioactivity can be measured. This increase is in turn a function of the change in magnitude of the characteristic being measured at the bottom of the well. If the input mud is known to be substantially free of radioactivity, and in the following description of the present invention it is assumed to be so, then the amount of radioactivity of the output mud will be indicative of the magnitude of the characteristic measured in the bottom of the well.

The apparatus of the present invention continuously measures and records the amount of radioactivity in the output mud at the top of the borehole, and the recording medium is so moved that the record of radioactivity corresponds to the depth at which the tracer was introduced into the drilling fluid. The apparatus illustrated in Figures 1 and 1A for drilling a well or borehole may be constructed and operated for the most part in accordance with modern conventional rotary drilling practice and has been illustrated only in part. It does, however, employ a circulating drilling fluid such as a suspension of clay solids in water and conventionally termed "rotary mud," or simply "mud," which is forced down the drill stem and out through the drill bit into the borehole, to carry the drill cuttings up and out of the borehole as drilling proceeds. The upper portion of the hole is lined with a surface casing 2 which usually extends but a comparatively short distance into the drilling well. At its upper end the casing 2 is provided with a side outlet pipe 3 for discharging the returning stream of circulating drilling mud from the borehole. The pipe 3 leads into a shale shaker 4 having the function of separating out the formation cuttings carried upward by the drilling mud. The mud passes from the shale shaker 4 through a radioactivity measuring device 6, which may comprise apparatus well known in the art for measuring radioactivity, and thence through a discharge nozzle 7 into a conventional mud ditch 5. A visual radioactivity indicator 6' may be associated with the radioactivity measuring device 6.

Extending into the well through the casing 2 and borehole 1 is a conventional hollow drill string usually composed of drill pipe of ferro-magnetic material such as steel, designated generally by the numeral 8 in the drawings, which is connected at its lower end to a drill bit 9 having fluid discharge openings 10 adjacent the cutting teeth or cutting edge of the bit. A kelly joint 11 is connected to the upper end of the drill string and extends through a rotary table 12 mounted conventionally on the floor of a derrick and which is rotated by apparatus (not shown) in order to effect rotation of the drill bit. The upper end of the kelly joint is connected to the usual rotary hose swivel, and the entire drill string is suspended from a traveling block 14 which is adapted to be raised and lowered in the derrick in accordance with conventional practice by well known means.

The apparatus for circulating the drilling fluid through the borehole comprises the mud ditch 5 previously referred to, a settling pit 15, suction pit 16, and a mud circulation pump 17 having a suction pipe 18 leading to the suction pit and a mud discharge pipe 19 in communication with the drill pipe 8, through the swivel 13. The volumetric flow of mud through the discharge pipe 19 and the well may be measured by a fluid meter 20, which may be of any conventional suitable type.

The lower portion of the drill string may be constructed as disclosed in my previously referred-to copending applications and includes a drill collar 21. A considerable portion of the exterior of the drill collar 21 is provided with an impervious wrapping or covering 22 of insulating material. A pair of spaced, electrically conductive electrode rings 23 and 24 are secured to the exterior of the insulating sleeve 22.

The electrodes are connected across a suitable source of electric potential to effect a flow of current between them, the current flow being along the path approximately indicated by the dotted lines 25. As shown, the current flows through the drilling fluid into the earth's formation in the neighborhood of the drill collar. The current flows from that one of the electrodes, which may, for example, be electrode 23, which is connected to the positive terminal of the potential source, to the one connected to the negative terminal, which may be electrode 24, through the annular mud section 26 adjacent and surrounding electrode 23, through adjoining portions of the earth's formation located predominantly within the region indicated at 27, and thence to electrode 24 through the annular mud section 28 adjacent and surrounding electrode 24. The geometry of the system is so arranged that the resistance of the annular mud sections 26 and 28 is small as compared with the resistance of the earth's formation through which the current flows. Consequently, the magnitude of the current flow between the electrodes depends to a very large extent upon the resistivity of the formations in the region 27.

The flow of the current through the electrodes is utilized, as described in the aforementioned copending applications, to release radioactive tracer material from the electrodes into the drilling mud in amounts proportionate to or bearing a predetermined relation to the resistance or resistivity of the earth's structure in the region being drilled. The material so released is carried along with the drilling fluid flowing upwardly through the annular space in the borehole between the drill pipe and the borehole walls, to the earth's surface at the top of the borehole, where it is discharged through pipe 3, and flows through shale shaker 4 and radioactivity detecting and measuring device 6 to the mud ditch 5. The amount of tracer material in the outgoing mud stream is measured by the radioactivity radiation detector 6 through which the mud flows as before described, and a continuous record of the amount of tracer material thus measured is made upon a moving, elongated, light-sensitive record medium, strip chart 30 forming part of a recording galvanometer 31. The galvanometer 31 may be of any well known type, such as, for example, one employing a light beam source 32, and a mirror 33 which is moved to deflect the light beam laterally across the chart 30 in response to the amount of tracer material measured by the radiation detector 6, to which the galvanometer is electrically connected by conductors 34.

The record strip 30 is moved longitudinally in the direction indicated by arrow 30', in accordance with the present invention, so that its position relative to the lateral line of impingement of light beam 32' thereon is determined by and is indicative of the depth at which the measured tracer material is released in the borehole, the time delay due to the travel time of the tracer material from the point of release adjacent the bottom of the borehole to the detector being compensated for automatically, as hereinafter described. The record strip is so moved by a suitable roller means coupled to a shaft 35 which is driven, as hereinafter more fully described, by driving means 62 that any particular increment or part of the graphical record produced on the record strip is properly correlated with the borehole depth at the time the tracer producing that part of the record was released in the borehole. Thus increases in depth of the borehole during the travel of the tracer from its point of release to detector 6, are automatically compensated. A curve or graph 37 is thereby drawn upon the chart 30, which is indicative of borehole depth versus measured radioactivity.

Receiving apparatus 40, which may take any one of the several forms best shown in connection with Figures 2 and 4, as will be described hereinafter in greater detail, is supplied with drill string depth indicating impulse signals from transmitting apparatus, indicated generally at 41, secured to and rotating with the rotary table 12. These signals are utilized to operate, through shaft 39 and through a maximum depth counter device 45 and shaft 38, an impulse generator device 51 in one direction in response to the depth of the bit at the time of detection of the tracer, and a maximum depth indicator 70, as will be described hereinafter. The transmitting apparatus 41 may take any one of the several forms best shown in Figures 2, 3, and 6, the form shown in Figure 3 being illustrated by way of example in connection with Figure 1, and in the case of Figure 3 includes transmitters 42A and 42B adapted to transmit signal impulses on different frequencies. The receiving apparatus associated therewith includes receivers 44A and 44B each adapted to selectively receive the signals of one of the transmitters 42A or 42B, and these receivers are adapted to control suitable apparatus for rotation of shaft 39 such that the latter is rotated through an equal angle in one direction or the other in response to each signal received by a receiver, the direction of such rotation being dependent upon which of the receivers receives the signal from its associated transmitter, and the extent of such rotation of shaft 39 in each direction being dependent upon the number of such signals. The transmitters 42A and 42B are selectively energized to transmit selectively different signals in response to up or down movement of the drill string and at intervals corresponding to equal lengths of movement of the drill string. The detailed construction and operation of the transmitting and receiving apparatus, which also constitute a continuously operating depth indicating means, will be described in greater detail hereinafter in connection with Figures 2 et seq.

As heretofore noted, a certain known number of pump strokes of the drilling fluid circulating pump are required for the tracer to travel with the fluid from the release point within the borehole to the detecting device at the top of the borehole. Assuming this number to be, for example, 1,000 pump strokes at a particular borehole depth, then by suitably correlating the pump with the device for driving the record strip 30, the position or movement of the latter can be controlled, as will now be described.

The pump 17 is driven by a motor 46, which also drives simultaneously and synchronously therewith, through suitable reduction gearing 46', a spool 47 arranged to move an elongated record medium, such as a magnetic recorder wire 48, in the direction indicated by arrow 53, from spool 49 to spool 47.

The lineal speed of the wire 48, thus driven, is proportional to the number of pump strokes per minute and thus proportional to the upward velocity of the tracer-carrying fluid flowing upwardly within the borehole. The wire has associated with it a magnetic recording head 50 which is arranged to make a magnetic mark on the record wire 48 each time the drill bit has increased its depth by a suitable predetermined amount, such as, for example, one foot. This mark is placed on the wire by supplying the recording head 50 with an electrical impulse each time the drill bit has advanced this predetermined distance. This is readily accomplished by electrically coupling the recording head 50, through conductors 52, to the impulse generator 51, which is driven by shaft 39 through the before-mentioned maximum depth counter device 45 and shaft 38, whereby a current impulse is supplied to the recording head each time the shaft 39 rotates an amount corresponding to one-foot increase in depth of the drill string 8.

Figure 10:
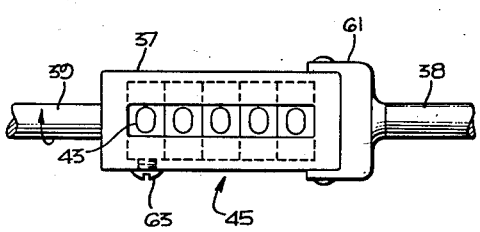
Figure 10 is a diagrammatic detail view of a maximum depth counter device as shown in Figure 1.

The maximum depth counter device 45 is a device capable of transmitting rotation from the input shaft 39 to the output shaft 38 in one rotational direction only, which for convenience of description may be considered herein as the forward direction, and the mechanism of this device is such that, in the event the input shaft 39 turns in the reverse direction any number of turns, it will not resume the transmission of forward rotation to shaft 38 until the input shaft 39 has again rotated forwardly a number of times equal to the previous number of reverse turns. An example of a device suitable for this purpose is illustrated in Figure 10, wherein a counter device 37, which may be a Veeder reversible revolution counter of well known type, is employed. The input shaft 39 of the counter is coupled to the before-mentioned receiving apparatus 40 of the depth measuring apparatus, and the opposite end of the body of the counter device 37 opposite to the shaft 39 is coupled at 61 to the output shaft 38 leading to the impulse generator 51. The end counter wheel 43, which normally indicates the highest multiples on the counter scale, is locked against rotation with respect to the counter body 37 by suitable means, such as by a setscrew 63, such that, when the shaft 39 is rotated in a clockwise direction or forward direction, as hereinbefore defined, the counter scale will attempt to shift back from 00000 to 99999, but since the last or highest digit wheel is locked, as before mentioned, clockwise rotation of the shaft 39 relative to the counter body in this direction is thereby prevented. Under this condition, the clockwise rotation of shaft 39 is transmitted through the counter body 37 to the output shaft 38. When the shaft 39 is rotated in a counterclockwise or reverse direction, the shaft 39 is free to rotate relative to the counter body 37 and to actuate the counter in the normal manner, under which condition the counter body 37 remains stationary and no counterclockwise rotation will be imparted through it to shaft 38. It is apparent, therefore, that, without imparting rotation to shaft 38, shaft 39 can rotate any number of turns counterclockwise up to the highest number which can be counted on the particular counter employed, with the highest digit wheel locked, as hereinbefore described, for example, up to 9999 on the five-place scale herein illustrated. After having thus rotated counterclockwise or in reverse a certain number of revolutions, the shaft can then be rotated the same number of revolutions in a clockwise or forward direction before the rotational limit of shaft 39 relative to the counter body is again reached and coupling again established through from shaft 39 to shaft 38.

A counter of any desired capacity or a number of counters coupled in end-to-end series may be employed, as required, to provide a sufficient number of turns for the full borehole depth measuring range of the apparatus.

Thus the impulse generator 51 is actuated through shaft 38 to produce impulses indicative only of predetermined advances or increases in the total depth of the drill bit within the drilled borehole, and upward and downward movements of the drill bit within the borehole already drilled do not actuate the impulse generator.

The pulses thus derived from impulse generator 51 and used in marking the wire synchronously with the progress of the bit are subsequently reproduced by pulse reproducing head 54 which is spaced lengthwise of the recorder wire in the direction of its motion, from the recording head 50, a distance equal to the distance the wire is moved during the 1,000 strokes of the mud circulating pump assumed by way of example. Inasmuch as this distance increases with the drilling progress of the drill bit, and the number of strokes of the pump required to circulate drilling fluid from the bottom of the borehole to the top proportionately increases, means are also provided for automatically moving the recording head 50 relative to the reproducing head 54 in response to and in proportion to the downward drill string movement accompanying the drilling progress. This is accomplished by mechanism indicated generally by the reference character 55, which includes an electrically actuated counter device 56 having an input circuit 57 connected to conductors 52 and thus to the before-mentioned impulse generator 51. Counter 56 drives a rotatable shaft 57' in uniform angular increments in one direction in response to the impulses from impulse generator 51. Shaft 57' is connected by suitable gearing to a threaded lead screw 58 upon which is threadedly mounted a longitudinally movable support 59 for the recording head 50. The lead screw 58, while shown for convenience of illustration as of limited length relative to the length of recording wire 48 extending between spools 47 and 49, may be made any length required to suit the range of operation of the device to any depth and range of depths of borehole at which logging operations are to be conducted.

The impulses marked upon the recorder wire by recording head 50 are, after a time delay equal to the time required for the movement of the wire 48 to carry the mark from the recording head 50 to the reproducing head 54, reproduced electrically by the reproducing head 54 and transmitted through conductors 64 to an electrically actuated counter device 62. The shaft 35 of counter 62 is rotated thereby in uniform angular increments in one direction in accordance with the number of impulses thus applied to it, and, since shaft 35 is coupled to the strip chart transporting mechanism of recorder 31, the chart 30 will be accordingly moved at an average rate and for a distance determined by the frequency and number of such impulses.

Instead of using a magnetic wire as shown at 48 for the recording medium, recording tapes and the like recorder mediums can be used. Also, other types of apparatus can be used, such, for example, as a paper strip adapted to be perforated and having associated with it devices for producing impulses in response to the perforations.

The maximum depth reached by the drill string or the total depth of the borehole can be continuously and visually indicated, as by a suitable counter 70 driven by a suitable extension 36 of the shaft 38 of the maximum depth counter apparatus hereinbefore described.

The logging operations of the apparatus may be initiated at the beginning of drilling or at any desired depth D of the borehole. Assuming the logging operations to be initiated at depth D, the recording head 50 is first manually adjusted by lead screw 58 to a position at a distance from reproducing head 54 such that the time required for a given point on the wire 48 to travel from recorder head 50 to the reproducer head 54 is just equal to that required for a given unitary portion of drilling fluid to flow from the vicinity of the electrodes 23 and 24 at borehole depth D to the radioactivity measuring device 6 at the top of the borehole, which is the same time required for the 1,000 pump strokes to be made, as hereinbefore mentioned by way of example. Once this adjustment is made, change or variation of speed of the drilling fluid circulating pump 17 will not necessitate any manual readjustment of the recorder head 50, since the relationship between the speed of movement of the wire 48 and the rate of flow of fluid will remain constant by reason of their common drive coupling.

Simultaneously with each impulse transmitted from the pulse generator 51 to the recording head 50, a portion of the same impulse is received by and actuates counter device 56 to cause the recorder head to be moved an incremental distance away from reproducer head 54 which is proportional to the corresponding increased depth of the electrodes 23 and 24, thereby automatically continuously adjusting the distance between recording head 50 and reproducing head 54 in proportion to the increasing depth of the borehole.

Following this, each time the drill string moves downward to an increased depth of one foot, one of the the two transmitters, say the transmitter 42A, which may be assumed to be the one actuated for signaling downward motion of the drill string, sends out a signal impulse which is received by the receiver 44A, resulting in rotating shaft 39 clockwise or forwardly, say through an angle of 360 degrees. This rotation of shaft 39 is transmitted through the maximum depth counter device 45 and thence through shaft 38 to the impulse generator 51 and through shaft 36 to the depth counter 70. Thus, for each one foot downward progress of the drill string 8 and increase of depth of the bore, the impulse transmitter 51 transmits one impulse to the recording head 50, and a mark is placed upon the moving magnetic wire 48. The marks thus placed on the wire are subsequently "picked up" by the reproducing head 54, after a time delay as hereinbefore described, and the resultant electrical impulses are then conducted through conductors 64 to the impulse counter 62, which is coupled through shaft 35 to the driving device of the chart 30 to move it a predetermined distance for each such impulse to a position corresponding to the actual depth of the drill bit $d_1$ at that time, minus the distance $d_2$ which the drill bit has moved during the 1,000 pump strokes, distance $d_1$—$d_2$ being equal to D, the depth at which the tracer detected by detector 6 at any given instant was released. Thus the measurements made by detector 6 are recorded on the card 30 as shown at 37 in Figure 1, in such fashion as to be correlated with the actual depth of the borehole at the time of release of the tracer, and the characteristics of the borehole being logged are thereby properly correlated with the borehole depth to which they relate.

Figure 2:
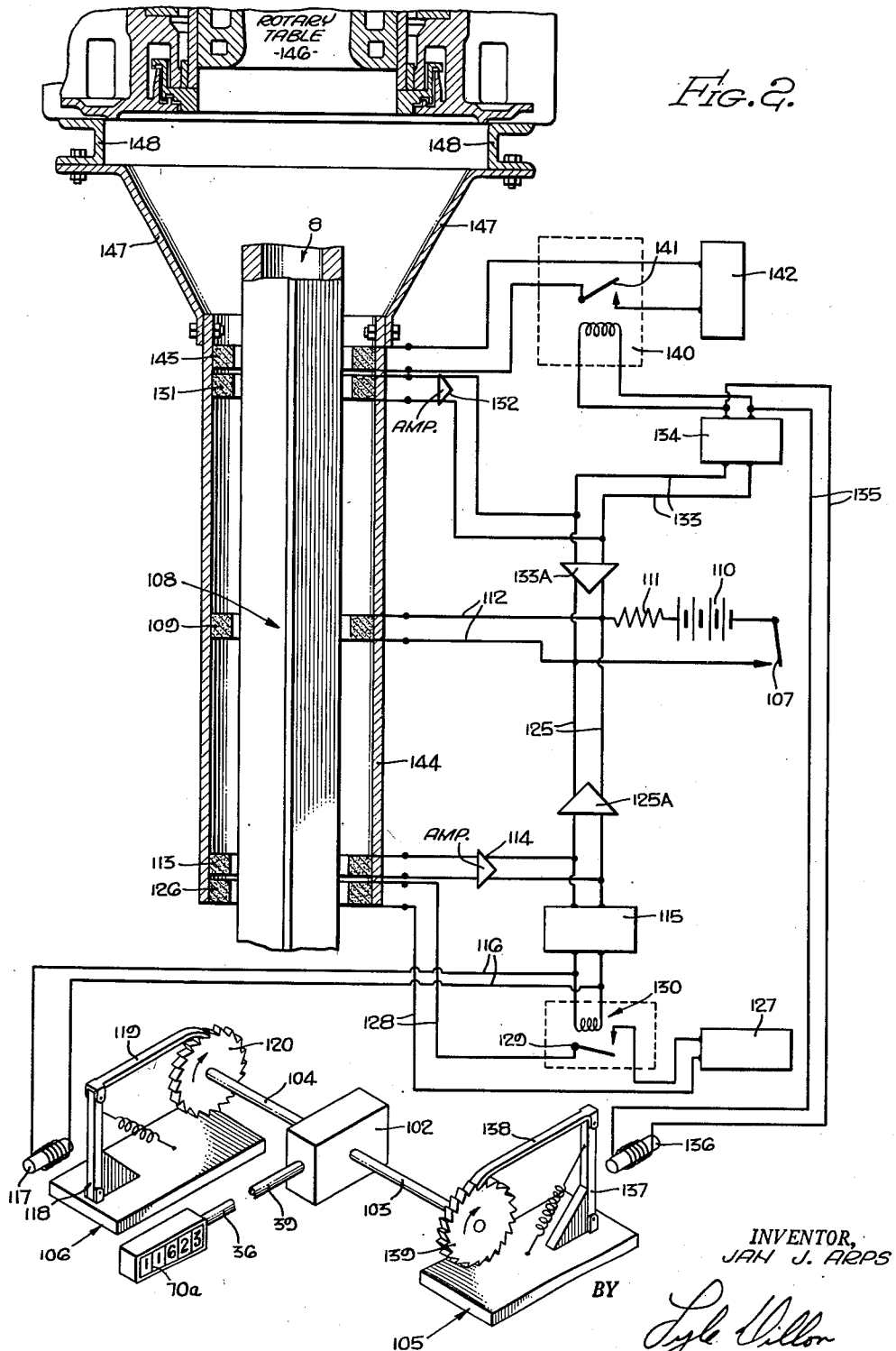
Figure 2 is a schematic representation of one embodiment of depth measuring apparatus constructed in accordance with the present invention and which may be used in conjunction with the apparatus of Figure 1.

Various depth measuring apparatus which can be utilized with the system of Figure 1 are illustrated in Figures 2 to 8, and they will be described hereinafter, beginning first with the embodiment illustrated in Figure 2. This depth measuring apparatus includes signal producing means cooperatively associated with a drill string for producing signals in response to vertical movements of the drill string, and means for receiving such signals and controlled by such signals for producing and transmitting other signals for indicating the depth of the drill string. The other signals are produced whenever the drill string moves a predetermined distance up or down and are used differentially or algebraically to operate a depth counter 70a to provide either a continuous indication of the actual depth of the drill string at any given time or to provide an indication of the total depth of the borehole. The counter 70a is operated through a shaft 39a from differential gearing 102 connected by shafts 103 and 104 to electromagnetic operating devices 105 and 106, respectively, which are selectively and intermittently operated, one in response to the upward movements and the other to downward movements of the drill string.

The apparatus is adapted to be placed in operation upon the establishment of a mark on the drill string. This mark may be and is illustrated as being a magnetic mark and one that is produced upon the closure of a manually operable switch 107. When the switch is closed, a magnetic mark is produced by longitudinal magnetization in the region 108 of the drill string by the passage of current through a magnetic marking coil 109 which is connected upon closure of the switch to a battery 110 through a resistor 111 and conductors 112.

The movement of the drill string carrying the magnetic mark thereon a predetermined distance up or down from the location of coil 109 is utilized to produce a control signal, as hereinafter described. When the drill string moves downwardly, the mark moves into the region of a downward pick-up coil 113, and a signal is thus inductively produced in this coil. This signal from coil 113 is amplified by the amplifier 114 and supplied to the input of a rectifier 115. The rectified signal from rectifier 115 applies an operating signal voltage from its output through conductors 116 to electromagnet 117 of the counter operating means 106. The electromagnet attracts armature 118 to move the pawl 119 which is in engagement with the ratchet teeth of the ratchet wheel 120 to rotate the latter through a unit angular distance, which may correspond to the angle subtended by one ratchet tooth, each time the drill string moves downwardly a predetermined distance.

The amplified signal voltage supplied by the amplifier 114 is utilized to produce, at the same time, another magnetic mark on the drill string, and this is done by connecting the output of amplifier 114 to an isolating amplifier 125A, and thence through conductors 125 and the previously referred-to conductors 112 to coil 109. The detected magnetic mark, after passing through coil 113, is erased from the drill string by a downward demagnetizing coil 126 which is connected through the conductors 128 to a source of alternating current, such as a high frequency oscillator 127, upon closure of switch 129 of a time delay relay 130. The time delay relay 130 is connected to and controlled by the output of rectifier 115.

The indication of upward movement of the drill string is provided by similar apparatus operative in the same manner as before described in connection with the apparatus for indication of downward movement. This includes an upward pick-up coil 131 connected through amplifier 132 and conductors 133 to the rectifier 134 and also through the conductors 133, isolating amplifier 133A, and conductors 112 to the magnetic marking coil 109. The output of rectifier 134 is connected by conductors 135 to operating electromagnet 136 of the counter operating device 105, the armature 137 of which is operatively connected to pawl 138, which is in engagement with the ratchet teeth of the ratchet wheel 139. The output of rectifier 134 is also connected to the time delay relay 140, the switch 141 of which is adapted to connect an oscillator 142 to the upward demagnetizing coil 143.

The marking, detecting, and demagnetizing coils may be supported in concentric relation to the drill string 145 by any suitable structure, such as by the non-magnetic tubular member 144 which may be connected to the under side of the non-rotating portion of the rotary drill table 146 by braces 147 and supporting beams 148. The tubular member 144 may be made of copper or other suitable metal or material.

In operation of the depth measuring apparatus of Figure 2 in connection with the logging apparatus of Figure 1, hereinbefore described, the switch 107 is first closed briefly to energize coil 109, thereby magnetically to mark the drill string initially at 108 at a known or measured distance from the drill bit 9 or electrodes 23, 24. At this instant the chart 30 of recorder 31 is set to start the record at a suitable reference point on the chart corresponding to the before-mentioned known distance to the drill bit or electrodes. When the drill string moves a distance equal to that between the coil 109 and either coil 113 or 131, the magnetic mark 108 is moved therewith into either coil 113 or 131, resulting in a control signal being supplied to the associated amplifier 114 or 132, as the case may be. The amplified signal is supplied from either amplifier to coil 109 to place a new mark on the drill string and also at the same time to one of the rectifiers 115 or 134. For example, if by downward movement of the drill string the magnetic mark is carried down into coil 113, the amplifier 114 supplies a voltage pulse to electromagnet 136 to operate the counter actuating unit 105 to cause counter 70a to add one unit of indicated depth or distance equal to the distance between coil 109 and coil 113, and also to operate, with a suitable time delay, the relay 130 whereby the oscillator 127 is connected to the demagnetizing coil 126 to erase the detected magnetic mark.

When the drill string moves upwardly, carrying the magnetic mark 108 upward into coil 131, the resultant amplified signal from amplifier 132 is supplied to coil 109 and to rectifier 134. The resultant voltage pulse from the output of the rectifier 134 is supplied to electromagnet 136 of the counter actuating unit 106, and the counter is thereby caused to move one unit of indicated depth or distance in an upward direction equal to the distance between coil 109 and coil 131. The pulse from the rectifier 134 also actuates relay 140, which operates with a suitable time delay to connect the oscillator 142 to the upward demagnetizing coil 132 to erase the detected magnetic mark.

The counter shaft 39 and counter 70a, if connected directly thereto, are thus selectively operated, in one direction or the other, intermittently in response to corresponding direction and distance of movement of the drill string.

Figure 3:
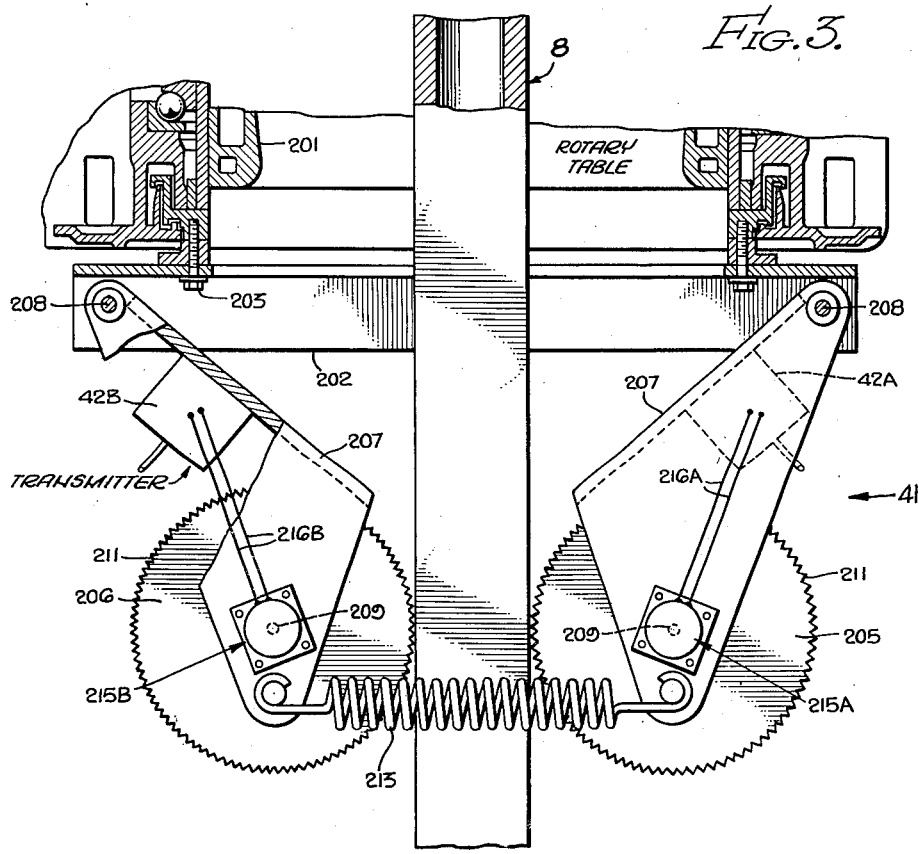
Figures 3 and 4 are diagrammatic illustrations of another embodiment of depth measuring apparatus of the present invention and which may be used in conjunction with the apparatus of Figure 1.
Figure 4:
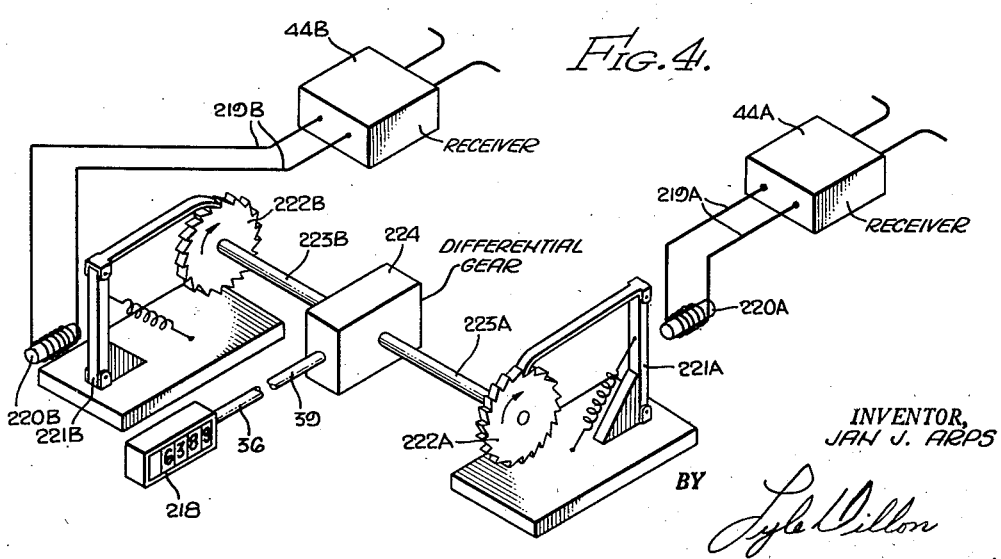
Figure 5:
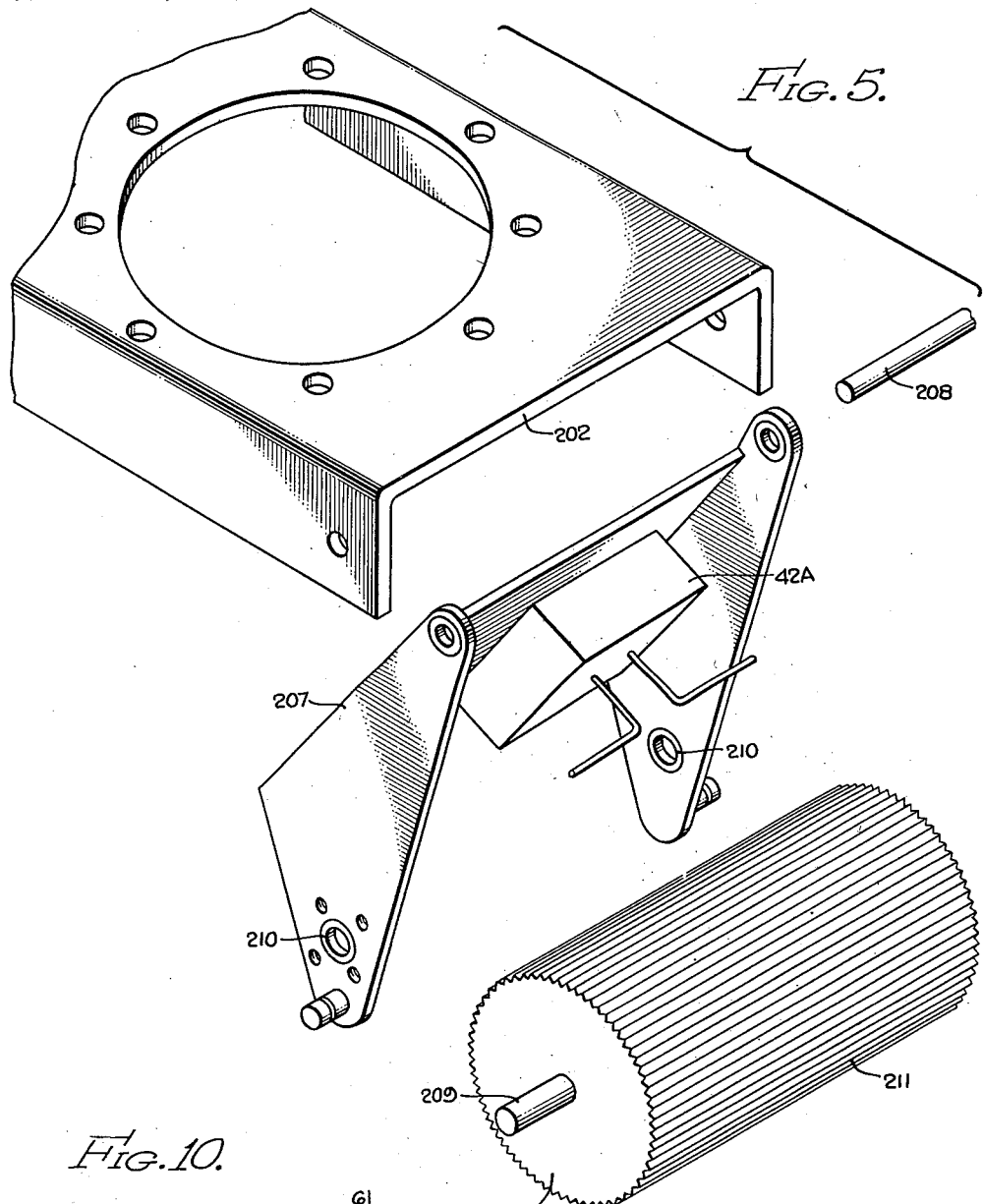
Figure 5 is an exploded, fragmentary view of a part of the apparatus illustrated in Figure 3.

A modified form of depth measuring apparatus is illustrated in Figures 3 to 5, inclusive. In brief, this apparatus, as herein illustrated, includes a pair of pivotally supported rollers 205 and 206 resiliently biased into engagement with opposite sides of the drill string 8, a pair of signal generating means 42A and 42B which are selectively rendered intermittently operative in response to longitudinal movement of the drill string 8 in opposite directions, receiving apparatus including receivers 44A and 44B selectively and periodically operated by the signal generating means, and means for algebraically counting the said operations thereby to measure the drill string movement into and out of the borehole.

The transmitting apparatus is suspended from the rotatable portion of the rotary table 12 for rotation therewith, by means of an adapter bracket 202 secured to the under side of the table in suitable manner, as by cap scerws 203. The drill string engaging rollers 205 and 206 are movably supported underneath the rotary table by means of lever arms 207 which are pivotally mounted at their upper ends upon shafts 208. The rollers 205 and 206 are mounted on shafts 209 which are rotatably journaled in bearings 210 carried adjacent the lower ends of the lever arms 207, as best shown in Figure 5. The rollers 205 and 206 are provided, on the exterior cylindrical surface thereof, with longitudinally extending teeth 211 to make non-slipping engagement with the conventional steel drill pipe of the drill string 8. The rollers 205 and 206 are pivotally biased to move laterally toward each other and into rolling engagement with the drill pipe extending therebetween by means of springs 213, with sufficient force to provide the required friction for proper rotation of the rollers in opposite directions as the drill string is raised or lowered. The rollers 205 and 206 are also of sufficient width so as to engage the drill string even when the latter is displaced from the center of the rotary table lengthwise of the rollers. Lateral displacement of the drill string radially of the rollers is permitted by the before-described hinged mounting of the rollers.

The signal generating means controlled in response to vertical movement of the drill string include the transmitters 42A and 42B which are mounted on the lever arms 207. These transmitters are selectively rendered operative in response to longitudinal movement of the drill string in opposite directions into or out of the borehole, by signal producing means 215A and 215B, which include suitable switches and clutches, not shown, but which are so arranged that a switch of 215A is intermittently operated when the drill string moves upwardly, the switch being closed and opened a number of times proportional to the length of longitudinal movement of the drill stem 8 upwardly through the rollers 205 and 206, and a switch of 215B is similarly operated when the drill string moves downwardly. The signal producing means 215A is coupled by conductors 216A to the transmitter 42A, and the latter is thereby intermittently operated to transmit signals intermittently, the number of which is correspondingly proportional to the length of longitudinal movement of the drill string upwardly out of the borehole. The signal producing means 215B is similarly coupled by conductors 216B to the transmitter 42B and controls its operation in like manner. The transmitters 42A and 42B are arranged to produce signals which are distinctive from one another, for example, electromagnetic or radio signals of different frequencies.

The signals transmitted by the transmitters 42A and 42B are received by the receivers 44A and 44B, which may be located at a desired remote point and which, when the signals are distinctive by reason of having different frequencies, are tuned to receive signals of the frequency of the transmitters 42A and 42B, respectively. Whenever a receiver receives such a signal, it supplies an electrical impulse to actuating means connected through a suitable differential device to an indicator, such as the counter 218, to provide an accurate indication of the travel of the drill string in opposite directions and continuously to indicate the length of pipe within the borehole. The transmitters 42A and 42B and receivers 44A and 44B may comprise electrical apparatus for the transmission and reception of radio waves, more or less conventional in the radio engineering art.

The current pulses from the receivers 44A and 44B pass through conductors 219A and 219B to their respective operating electromagnets 220A and 220B. When an electromagnet is thus energized, it attracts its associated armature 221A or 221B to effect rotation of its corresponding ratchet wheel 222A or 222B through a suitable angle, such as, for example, that corresponding to one ratchet tooth. The ratchet wheels 222A and 222B are connected by the shafts 223A and 223B to a differential gear arrangement 224, the output shaft 39 of which may be operatively connected to the logging apparatus shown and hereinbefore described in connection with Figure 1 which includes the counter 70.

The rotation of the output shaft 39 is thus responsive to the algebraic sum total of all the up and down movements of the drill string between the rollers 205 and 206, and the reading of counter 70 if connected directly to shaft 39 thus provides an indication of the amount of drill pipe which is extended through the rotary table and past the measuring rollers 205 and 206 into the borehole. The counter 70, if connected to shaft 39 as shown in Figure 1, provides an indication of the maximum depth reached by the drill string. It is obvious that this measuring system is unaffected by rotation of the rotary table 12 during drilling, since the pipe and measuring rollers rotate together with the rotary table.

Another embodiment of the depth measuring apparatus is illustrated in Figures 6 to 9, inclusive, to which reference will now be had. In brief, the apparatus illustrated in these figures includes a broad endless belt-like element having spaced magnetic portions magnetically engageable with and adapted to be driven in one direction or the other by the longitudinal movement of the drill string upward or downward in the borehole, a pair of signal generating means, and means for selectively and periodically rendering the signal generating means operative in response to such upward and downward movements of the drill string.

The apparatus of this embodiment of the depth measuring apparatus is adapted to be suspended underneath and to rotate with the rotating portion of the rotary table 12 by an adapter bracket 302 secured to the under side of the rotary table in suitable manner, as by the cap screws 304.

The endless belt-like element, having spaced magnetic portions and which is engageable with and driven by the drill string 8, is indicated generally at 306. As illustrated in Figures 8 and 9, this belt-like element is in the form of a broad magnetic chain composed of a series of permanently magnetized links 307 separated from one another by links 308 of non-magnetic material, such as brass. The magnetic chain 306 is movably mounted upon a broad measuring sprocket 309 and a broad idler sprocket 310 which are carried on shafts 312 and 313, which are in turn rotatably mounted in anti-friction bearings on spaced-apart support brackets 314.

The magnetic chain 306 is resiliently held against the drill string so that the portion thereof in magnetically induced gripping engagement with the drill string will partake of the vertical movement of the drill string in opposite directions when the drill string is moved vertically up or down through the rotary table and irrespective of whether the rotary table is rotating or not. This is accomplished by supporting the chain for rotary movement together with the rotary table. To accomplish this, the two chain supporting brackets 314 are mounted upon a plurality of horizontal guide rods 315, preferably four in number, of which but two are visible in the view of Figure 6. The guide rods 315 are supported for horizontal sliding motion in suitable guides carried in a pair of vertical main supporting elements 316, of which but one may be seen in Figure 6, said main supporting elements being attached at their upper ends to the adapter bracket 302. The chain is yieldably held against the drill string by helical springs 317 surrounding the guide rods 315 and acting in compression between the supporting brackets 314 and the main supporting elements 316.

Attached to the main supporting elements 316 are a pair of signal transmitters 42A and 42B, the same as or similar to transmitters 42A and 42B hereinbefore described in connection with Figure 3, and adapted to be controlled in response to vertical movement of the drill string into and out of the borehole.

The transmitters 42A and 42B are selectively and intermittently rendered operative in response to movement of the drill string in opposite directions into or out of the borehole by control-signal producing means indicated generally at 320. This control-signal producing means includes a pair of oppositely acting control switches 321A and 321B coupled by the conductors 322A and 322B to the transmitters 42A and 42B, respectively. The switches 321A and 321B may be of a suitable sensitive type similar in construction to those shown at 215A and 215B in Figure 3 and arranged to be intermittently momentarily closed in response to predetermined unitary distances of movement of the drill string in one direction or the other into or out of the borehole. The switch 321A may be arranged to be actuated only when the drill string moves downwardly, while the switch 321B may be arranged to be actuated only when the drill string moves upwardly. Such operation of the switches can be readily effected by employing a one-way overriding clutch between each of the cams 323A and 323B and the shaft extension 324 of measuring sprocket shaft 312, said overriding clutches being oppositely acting relative to the direction of rotation of shaft 324. A cup-like housing 325, suitably secured to the exterior of the anti-friction bearing support 326, serves as a protective enclosure for the switching mechanism, as shown in Figure 7.

In operation, the magnetic chain 306 is attracted magnetically into engagement with the steel pipe of the drill string 8, and, inasmuch as it rotates with the rotary table and drill string, there will be no relative rotary motion between the drill stem and the chain. The chain however, will move in one direction or the other about the sprockets 309 and 310 with vertical movements of the drill string. When the drill string moves downwardly, the one-way clutch in cam 323A will cause the cam to rotate with shaft 324, 312, while cam 323B remains stationary, thereby causing the switch 321A to be actuated, and the number of times of such actuation will be proportional to the distance of such downward movement of the drill string. The transmitter 42A, connected through conductors 322A to the switch 321A, will thus be rendered operative to transmit corresponding intermittent signal impulses to the receiver associated with it which may be one such as the receiver 44A of the previously described apparatus of Figures 3 and 4.

When the drill string moves upwardly, the one-way acting clutch in cam 323B will cause it to rotate with shaft 324, 312, while cam 323B remains stationary, thereby causing switch 321B to be actuated a number of times proportional to the distance of such movement of the drill string. The transmitter 42B, connected through conductors 322B to the switch 321B, will thus be rendered operative to transmit corresponding intermittent signal impulses to the receiver associated with it, which may be one such as the receiver 44B of the previously described apparatus of Figures 3 and 4. The signals transmitted by transmitters 42A and 42B are, as before mentioned, received by receivers corresponding to receivers 44A and 44B of the previously described embodiment of Figure 1, 3, and 4 and operate indicating and/or recording mechanism like that heretofore described.

It is to be understood that the foregoing is illustrative only, and that the invention is not to be limited thereby, but includes all modifications thereof within the scope of the invention as defined in the appended claims.

What is claimed is:

1. In a system for logging a borehole during drilling with drilling equipment employing a hollow drill stem through which drilling fluid is circulated into and out of the borehole being drilled and upon which drill stem means is located adjacent the lower end thereof for releasing a tracer into the circulating drilling fluid in a manner indicative of the information to be logged, the apparatus comprising: tracer detecting means located adjacent the top of the borehole and responsive to tracer carried in the returning stream of circulating drilling fluid to produce a log signal representative of the said information to be logged; recorder means including a movable record medium and a recorder device for placing a record on said medium in response to said log signal produced by said detecting means; means for moving said record medium relative to said recorder device at a rate directly proportional to rate of increase in borehole depth; and means to introduce between occurrence of an increase in depth of said borehole and the corresponding proportional movement of said record medium, a time delay substantially equal to the time required for flow of circulating drilling fluid from the location of said tracer releasing means within the borehole to the said detecting means at the top of the borehole following the time of said increase in depth.

2. Apparatus in accordance with claim 1 in which said means for moving said record medium relative to said recorder device is coupled for actuation by movement of said drill stem.

3. Apparatus in accordance with claim 1 in which said means for moving said record medium relative to said recorder device is coupled for actuation by the downward movement of the drill stem which occurs incident to and simultaneously with increasing depth of the borehole.

4. Apparatus in accordance with claim 1 in which said means to introduce said time delay includes control means operative to vary said time delay in inverse proportion to the rate of flow imparted to the drilling fluid in said borehole.

5. Apparatus in accordance with claim 4 including means to circulate the driling fluid, and in which said control means also includes means driven by the driving means for circulating said drilling fluid.

6. In a system for logging a borehole during drilling with drilling equipment employing a hollow drill stem through which drilling fluid is circulated into and out of the borehole being drilled and upon which means is located adjacent the lower end thereof for releasing tracer into the circulating drilling fluid in a manner indicative of information to be logged, the apparatus comprising: tracer detecting means located adjacent the top of the borehole and adapted to detect tracer carried in the returning stream of circulating drilling fluid; a first recorder means including a first movable record medium, a first recorder device for placing signals on said first record medium, and a reproducing means for picking up signals from said first record medium, the length of said first record medium extending between said first recorder device and said reproducing means being variable; a second recorder means including a second movable record medium and a second recorder device for placing a record on said second medium; means to energize said first recorder device in response to the rate of increase in depth of said borehole; means controlled by said depth indicating means, for varying the said lengths of said first record medium extending between said first recorder device and said reproducing means in proportion to the increasing depth of the borehole; means to move said first record medium at a rate proportional to the rate of flow of drilling fluid in said borehole; means responsive to signals picked up by said reproducing means for moving said second record medium relative to said second recorder device; and means connecting said tracer detecting means to said second recorder device for placing a record on said moving second record medium in response to said tracer detecting means.

7. In a system for logging a borehole during drilling with drilling equipment employing a hollow drill stem through which drilling fluid is circulated into and out of the borehole being drilled and upon which means is located adjacent the lower end thereof for releasing tracer into the circulating drilling fluid in a manner indicative of information to be logged, the apparatus comprising: tracer detecting means located adjacent the top of the borehole and adapted to detect tracer carried in the returning stream of circulating drilling fluid; a first recorder means including a first movable record medium, a first recorder device for placing signals on said first record medium, and a reproducing means for picking up signals from said first record medium, the distance between said first recorder device and said reproducing means being variable; a second recorder means including a second movable record medium and a second recorder device for placing a record on said second medium; means to energize said first recorder device with intermittent electrical impulses the frequency of occurrence of which is proportionally indicative of rate of increase in depth of the borehole, thereby impressing corresponding signal impulses upon said first record medium; means also responsive to the aforesaid intermittent electrical impulses for increasing the said distance between said first recorder device and said reproducing means in proportion to the number of such impulses occurring; means to move said first record medium at a rate proportional to the rate of flow of drilling fluid in said borehole; means responsive to said signal impulses thus impressed upon said first record medium and subsequently picked up by said reproducing means for moving said second record medium relative to said second recorder device at a rate proportional to the frequency of said signals picked up by said reproducing means; and means connecting said tracer detecting means to said second recorder means for placing a record on said moving second record medium in response to said tracer detecting means.

8. In a system for logging an earth borehole during drilling with drilling equipment employing a hollow drill stem through which drilling fluid is circulated into and out of the bore hole being drilled and in which successive increments of the drilling fluid rising in the borehole from the lower end thereof during such fluid circulation vary in character in a definite relation to a variation in a physical characteristic to be logged, the apparatus comprising: a sensing means located adjacent the top of the borehole and adapted to produce a signal representing said character of said fluid increments as they circulate out of the borehole; recorder means including a movable record medium and a recorder device for placing a record indicative of said character of the drilling fluid on said medium in response to said signal; means to advance said record medium relative to said recorder device by incremental advances corresponding to respective increases of borehole depth, including means regulated in correlation with rate of circulation of drilling fluid in the borehole to delay a given advance of said record medium corresponding to a given increase of borehole depth, by a time interval substantially equal to the time interval required for circulation of an increment of drilling fluid from the location of the point of said given increase of borehole depth to said sensing means adjacent the top of the borehole.

9. In a system for logging a borehole during drilling with drilling equipment employing a hollow drill stem through which drilling fluid is circulated into and out of the borehole being drilled and upon which, means is located adjacent the lower end thereof for releasing tracer into the circulating drilling fluid in a manner indicative of information to be logged, the apparatus comprising: tracer detecting means located adjacent the top of the borehole and responsive to the thus released tracer carried in the returning stream of circulating drilling fluid to produce a log signal representative of the said information to be logged; a first recorder means including a first movable record medium, a first recorder device for placing signals on said first record medium, and a reproducing means for picking up such signals from said first record medium, the length of said first record medium extending between said first recorder device and said reproducing means being variable; a second recorder means including a second movable record medium and a second recorder device for placing a record on said second medium; energizing means to energize said first recorder device in response to and in a manner representative of the rate of increase in depth of said borehole to thereby place signals on said first record medium representative of the rate of increase in depth of said borehole; means controlled by said energizing means for varying the said length of said first record medium extending between said first recorder device and said reproducing means in proportion to the increasing depth of said borehole; means to move said first record medium between said first recorder device and said reproducing means at a rate proportional to the rate of flow of drilling fluid in said borehole; means responsive to signals picked up by said reproducing means from said first record medium for moving said second record medium relative to said second recorder device at a rate determined by said picked-up signals; and means connecting said tracer detecting means to said second recorder device for actuating said second recorder device in accordance with said log signal, thereby placing a record on said moving second record medium indicative of said information to be logged, correlated with depth of the borehole.

10. In a system for logging a borehole during drilling with drilling equipment employing a hollow drill stem through which drilling fluid is circulated into and out of the borehole being drilled and upon which means is located adjacent the lower end thereof for releasing tracer into the circulating drilling fluid at a rate indicative of information to be logged, the apparatus comprising: tracer detecting means located adjacent the top of the borehole and responsive to the quantity of tracer carried in the returning stream of circulating drilling fluid to produce a signal representative of said quantity; a first recorder means including a first movable record medium, a first recorder device for placing signals on said first record medium, and a reproducing means for picking up such signals from said record medium, the length of said first record medium extending between said first recorder device and said reproducing means being variable; a second recorder means including a second movable record medium and a second recorder device for placing a record on said second medium; energizing means to energize said first recorder device with intermittent electrical impulses the number of occurrences of which is proportionally representative of increase in depth of the borehole, to thereby impress corresponding signal impulses upon said first record medium representative of increase in depth of the said borehole; means also responsive to the aforesaid intermittent electrical impulses for increasing the said length of said first record medium extending between said first recorder device and said reproducing means in proportion of the said number of said impulses; means to move said first record medium relative to said first recorder device at a rate proportional to the rate of flow of drilling fluid in said borehole; means responsive to the number of said signal impulses picked up by said reproducing means from said first record medium, for moving said second record medium relative to said second recorder device at a rate having a predetermined relation to the said number of said signal impulses thus picked up by said reproducing means; and means for energizing said second recorder device with said log signal produced by said tracer detecting means for thereby placing a record on said moving second record medium indicative of said information to be logged, correlated with depth of the borehole.

11. Apparatus in accordance with claim 10 in which the said means responsive to the intermittent electrical impulses for increasing the said distance between said first recorder device and said reproducing means comprises means for moving said first recorder device relative to the rest of said first recorder means.

12. Borehole logging apparatus comprising: tracer releasing means adapted for longitudinal movement within a borehole; means for holding and moving the tracer releasing means in such borehole; means including circulating drilling fluid for moving released tracer from the tracer releasing means in the borehole to the top of the borehole; tracer detecting means located adjacent the top of the borehole; means coupled to said detecting means and including an elongated record medium for recording readings of said tracer detecting means; and means responsive to changes in depth of said tracer releasing means and the rate of circulation of said drilling fluid, for moving said record medium in correlation with said borehole depth of said tracer releasing means at the time of release of the thus detected tracer.

13. Borehole logging apparatus comprising: tracer releasing means adapted for longitudinal movement within a borehole; means for holding and moving the tracer releasing means in such borehole; means including circulating drilling fluid for moving released tracer from the tracer releasing means in the borehole to the top of the borehole; tracer detecting means located adjacent the top of the borehole and responsive to tracer carried to the top of the borehole in said drilling fluid; means coupled to said detecting means and including an elongated record medium and recorder means for making a record on said medium in response to said tracer detecting means; and means responsive to increases in maximum depth of said tracer releasing means in such borehole and the rate of circulation of said circulation drilling fluid therein, for moving said medium relative to said recorder means in correlation with the maximum depth which the said tracer releasing means had reached in said borehole at the time of release of the thus detected tracer.

14. Apparatus in accordance with claim 9 in which the said means controlled by said energizing means for varying the length of said first record medium extending between said first recorder device and said reproducing means comprises means for moving said first recorder device relative to the rest of said first recorder means.

References Cited in the file of this patent

UNITED STATES PATENTS

| Number | Name | Date |
|---|---|---|
| 1,982,184 | Williams et al. | Nov. 27, 1934 |
| 2,214,674 | Hayward | Sept. 10, 1940 |
| 2,315,355 | Scherbatskoy | Mar. 30, 1943 |
| 2,326,219 | Hayward | Apr. 10, 1943 |
| 2,364,975 | Heigal et al. | Dec. 12, 1944 |
| 2,400,046 | Hummel | May 7, 1946 |
| 2,404,132 | Hayward | July 16, 1946 |
| 2,436,503 | Cleveland | Feb. 24, 1948 |
| 2,528,956 | Hayward | Nov. 7, 1950 |
| 2,658,725 | Arps | Nov. 10, 1953 |
| 2,714,308 | Heck | Aug. 2, 1955 |